3,098,092
PROCESS OF PREPARING 4-AMINO-4'-CHLORO-2-STILBENECARBONITRILE
Eldred Welch, Westfield, N.J., assignor to General Aniline & Film Corporation, New York, N.Y., a corporation of Delaware
No Drawing. Filed Dec. 21, 1960, Ser. No. 77,280
8 Claims. (Cl. 260—465)

This invention relates to a process of preparing 4-amino-4'-chloro-2-stilbenecarbonitrile in good yields and of high purity by reduction of 4'-chloro-4-nitro-2-stilbenecarbonitrile in the presence of an alkoxyethanol as an inert solvent diluent.

4-amino-4'-chloro-2-stilbenecarbonitrile is a fluorescent compound giving off a bluish-white light when irradiated with ultra-violet light. This characteristic is required of a good brightener for textiles and other products. Since this compound does not have the other physical properties usually required of a brightener, for this purpose, it is preferably reacted with other compounds to form a molecular configuration which is very stable physically and which still retains its good fluorescent quality.

A great amount of difficulty is experienced with the reduction of this particular nitro compound to the amine. This difficulty is due to the fact that both the nitro and the amine are insoluble or soluble to only a small extent in the solvents ordinarily used for reductions and to the fact that the molecule contains several groups other than the nitro that are susceptible to reaction under iron and acid reduction conditions or to attack by catalytically activated hydrogen.

The solvents most often used for a reduction using iron and an acid are water and a lower alcohol or a mixture of the two. 4'-chloro-4-nitro-2-stilbenecarbonitrile and the amine derived from it are so insoluble in these solvents that they are useless for this purpose. Dimethylformamide serves as a better solvent for the reaction but it has several drawbacks. It is quite expensive; the solubility of the nitro and the amine in it is below a desirable level for this type of reaction necessitating a small batch size; and the amine produced using this solvent is relatively impure. These properties result in an expensive process and, consequently, a high cost for the product.

In the catalytic hydrogenation of this nitro compound, a number of solvents and a number of catalysts were used in an attempt to develop an economical process. Solvents such as acetic acid, aniline, dimethylformamide, benzene and toluene were used together with catalysts such as sponge nickel, nickel on kieselguhr, palladium on carbon, palladium on alumina, and platinum on carbon with unsatisfactory results. Using any combination of these solvents and catalyst the product was always impure. Although the source of the impurity was not definitely determined, it was very likely derived from hydrogenation of other groups in the molecule or else a hydrogenation resulting in a compound formed from a bimolecular reduction. The combination which gave fair results consisted of nickel on kieselguhr as catalyst and toluene as solvent. However, the final product was relatively impure and difficult to isolate because the desired amine and other hydrogenation products have a definite solubility in cold toluene.

I have discovered that 4'-chloro-4-nitro-2-stilbenecarbonitrile is readily reduced, either by catalytic hydrogenation with nickel catalyst or by reduction with iron and an acid in the presence of at least one solvent-diluent consisting of a 2-alkoxy-ethanol having the following formula:

$$ROCH_2CH_2OH$$

wherein R is an alkyl group of from 1 to 5 carbon atoms.

The presence of such 2-alkoxyethanol alone or as a mixture of 2 or more in either reduction process enhances the yield and purity of the final product. Although the reduction reaction proceeds well with those 2-alkoxyethanols having more than five carbons in the alkoxy group, it is preferable to use those having not more than five carbons such as for example 2-methoxyethanol, 2-ethoxyethanol, 2-propoxyethanol, 2-butoxyethanol and 2-amyloxyethanol, all of which have a very high solubility power for water. This is desirable because the most simple and the most economical method for isolating the product is to dilute the solution, after removing the hydrogenation catalyst or iron, with water. This, of course, would not be possible if water were not highly soluble in the solvent-diluent.

Since the solubility of the amine is very high in the 2-alkoxyethanol, it is possible to obtain a large yield from a given volume of solvent. For example, a run using 1,000 cc. of any of the 2-alkoxyethanols produces at least 310 grams of product. This figure is far lower when toluene is used. Also, the solubility of the amine in hot toluene is far less than in the 2-alkoxyethanols, making the yield from a given volume of solvent far less, since the product must be in solution for separation of the iron or hydrogenation catalyst. The yield resulting from runs while employing the 2-alkoxyethanols were close to quantitative and the purity of the product, without recrystallization, was more than 99% of that of a several times recrystallized standard.

In practicing the present invention, any of the two conventional reduction procedures, i.e., iron with hydrochloric acid or hydrogenation with a catalyst such as one consisting of 55–65% nickel deposit on kieselguhr, while employing the customary temperature ranges, may be used in the presence of the foregoing 2-alkoxyethanols alone or as mixtures of two or more. The ratio or proportion of such two or more 2-alkoxyethanols constituting a mixture is immaterial since no criticality is involved The following examples will show how the process of the present invention is practiced.

*Example 1*

Into a nitrogen-filled hydrogenation vessel equipped with a stirrer, there were charged 34 grams of 65% nickel catalyst deposited on kieselguhr, 750 cc. of 2-methoxyethanol and 277 grams of 4'-chloro-4-nitro-2-stilbenecarbonitrile and the mixture heated to 50° C. The agitation was then stopped and the vessel purged with hydrogen and finally filled with hydrogen to 50 p.s.i.g. The agitation was resumed and hydrogen passed in at a rate to maintain a pressure of 50 p.s.i.g. in the hydrogenation vessel. Thereafter, slight cooling was applied to the vessel to keep the temperature at 50° C. The passing of hydrogen to the vessel was continued until the theoretical quantity of hydrogen to reduce the nitro-group to the amine had been consumed. At this point, the up-take of hydrogen practically stops. The hydrogen presure was then released, the vessel purged well with nitrogen and the reaction mixture therein heated to 95° C. The catalyst was removed by filtering at 95° C. over a hot filter funnel, using a small amount of a diatomaceous earth to pre-coat the filter paper. To the filtered solution, tap water was added to precipitate the product. In this connection, 3 to 4 parts of water are usually required for each part of the reaction solution. The precipitated product was filtered at room temperature and the resulting cake washed with cold water to remove all of the 2-methoxyethanol. The resulting cake was then air-dried at 90° C. The yield obtained was close to quantitative. The purity, as determined by the ultra-violet spectrophotometer, is 99.1% of a several times recrystallized standard. The melting point of the final product is 169.4–169.8° C.

Example II

Example I was repeated with the exception that the 2-methoxyethanol was replaced by the same volume of 2-ethoxyethanol. The yield was close to quantitative. The melting point of the product was 169.5–169.9° C. with a purity of 99.1%.

Example III

Example I was repeated with the exception that the 2-methoxyethanol was replaced by the same volume of 2-propoxyethanol. The yield was close to quantitative. The melting point of the product was 169.5–170.0° C. with a purity of 99.1%.

Example IV

Example I was repeated with the exception that the 2-methoxyethanol was replaced by the same amount of 2-butoxyethanol. The yield was close to quantitative with the final product melting at 169.3–169.9° C. and the purity of 99.3%.

Example V

Example I was again repeated with the exception that 2-methoxyethanol was replaced by the same volume of 2-amyloxyethanol. The yield was close to quantitative with final product melting at 169.4–169.8° C. and having a purity of 99.0%.

Example VI

Into a 2-liter flask were charged 756 cc. of 2-methoxyethanol, 348 grams of finely divided iron and 54 cc. of 31% hydrochloric acid. The mixture was then heated to 95–100° C. and over a period of 1½ hours there were added 255.6 grams of 4'-chloro-4-nitro-2-stilbenecarbonitrile while maintaining the temperature of 95–100° C. The reaction mixture was agitated at this temperature for 1½ hours. Thereafter, there were added 50 cc. of 29% aqueous ammonia until the reaction mixture tested alkaline on phenolphthalein paper. Then there were added 12 grams of activated carbon and the mixture filtered over a hot Buchner funnel at 95–100° C. The filter cake was washed with small amounts of hot 2-methoxyethanol to remove the reaction solution. The filtrate was diluted to about 4500 cc. with water while agitating and then cooled to room temperature. The resulting mixture was then filtered and the resulting paste washed well with cold water. The washed paste was then dried in air at 90° C. The yield of the product was substantially quantitative and the purity as determined by the ultra-violet spectrophotometer was 99.9% of a several times recrystallized standard.

It is necessary to add some agent, preferably an alkaline one, before filtering off the iron cake, in order to remove all of the iron from solution and thus prevent contamination of the final product. Other alkaline materials such as sodium or potassium hydroxide or carbonate served this purpose just as well as the aqueous ammonia in the foregoing example.

The activated carbon is not essential to the process. It appears to produce a slightly lighter product.

To wash out the product-containing liquor from the iron filter cake a lower cost ketone such as acetone, methyl ethyl ketone, etc. may advantageously be used in place of the 2-alkoxyethanol, especially when production is on a commercial scale.

Other 2-alkoxyethanols or mixtures thereof can be used in place of the 2-methoxyethanol in the above example with similar results.

When using the 2-alkoxyethanols the product may be isolated either by distilling off the solvent, or by diluting the solution from the reaction with another solvent which is soluble in the 2-alkoxyethanol and in which the amine is insoluble.

Example VII

Example VI was repeated with the exception that the 2-methoxyethanol was replaced by 2-ethoxypropanol. The yields were substantially quantitative and the purity of the product was 99.9%.

Example VIII

Example VI was again repeated with the exception that the 2-methoxyethanol was replaced by 756 cc. of an equal mixture of 2-methoxyethanol and 2-propoxyethanol. The yield was substantially quantitative and the product had a purity of 99.9%.

Example IX

Example VI was again repeated with the exception that the 2-methoxyethanol was replaced by 756 cc. of an equal mixture consisting of 2-ethoxyethanol and 2-propoxyethanol with comparable results in yield and purity of product.

I claim:

1. The process of preparing 4-amino-4'-chloro-2-stilbenecarbonitrile which comprises reducing by the addition of hydrogen at a temperature of from 50° to 100° C. and a pressure of from atmospheric to 50 p.s.i.g. to 4'-chloro-4-nitro-2-stilbenecarbonitrile in the presence of at least one 2-alkoxyethanol as solvent-diluent having the following general formula:

$$ROCH_2CH_2OH$$

wherein R is an alkyl group of from 1 to 5 carbon atoms.

2. The process of preparing 4-amino-4'-chloro-2-stilbenecarbonitrile which comprises reducing by the addition of hydrogen at a temperature of from 50° to 100° C. and a pressure of from atmospheric to 50 p.s.i.g. to 4'-chloro-4-nitro-2-stilbenecarbonitrile in the presence of 2-methoxyethanol as solvent-diluent.

3. The process of preparing 4-amino-4'-chloro-2-stilbenecarbonitrile which comprises reducing by the addition of hydrogen at a temperature of from 50° to 100° C. and a pressure of from atmospheric to 50 p.s.i.g. to 4'-chloro-4-nitro-2-stilbenecarbontrile in the presence of 2-ethoxyethanol as solvent-diluent.

4. The process of preparing 4-amino-4'-chloro-2-stilbenecarbonitrile which comprises reducing by the addition of hydrogen at a temperature of from 50° to 100° C. and a pressure of from atmospheric to 50 p.s.i.g. to 4'-chloro-4-nitro-2-stilbenecarbonitrile in the presence of 2-n-propoxyethanol as solvent-diluent.

5. The process of preparing 4-amino-4'-chloro-2-stilbenecarbonitrile which comprises reducing by the addition of hydrogen at a temperature of from 50° to 100° C. and a pressure of from atmospheric to 50 p.s.i.g. to 4'-chloro-4-nitro-2-stilbenecarbonitrile in the presence of 2-n-butoxyethanol as solvent-diluent.

6. The process of preparing 4-amino-4'-chloro-2-stilbenecarbonitrile which comprises reducing by the addition of hydrogen at a temperature of from 50° to 100° C. and a pressure of from atmospheric to 50 p.s.i.g. to 4'-chloro-4-nitro-2-stilbenecarbonitrile in the presence of an equal mixture consisting of 2-ethoxyethanol and 2-n-propoxyethanol as solvent-diluent.

7. The process of preparing 4-amino-4'-chloro-2-stilbenecarbonitrile which comprises reducing by hydrogenation at 50° C. and a pressure of 50 p.s.i.g. with nickel catalyst 4'-chloro-4-nitro-2-stilbenecarbonitrile in the presence of at least one 2-alkoxyethanol as solvent-diluent having the following general formula.

$$ROCH_2CH_2OH$$

wherein R is an alkyl group of from 1 to 5 carbon atoms.

8. The process of preparing 4-amino-4'-chloro-2-stilbenecarbonitrile which comprises reducing by hydrogenation at 50° C. and a pressure of 50 p.s.i.g. with nickel catalyst 4'-chloro-4-nitro-2-stilbenecarbonitrile in the presence of 2-methoxyethanol as solvent-diluent.

No references cited.